United States Patent
Kim et al.

(10) Patent No.: US 7,494,242 B2
(45) Date of Patent: Feb. 24, 2009

(54) BACKLIGHT ASSEMBLY INCLUDING A DIFFUSER PLATE HAVING INDENTED PORTIONS AND A REFLECTIVE PLATE HAVING LAMP INSERTION PORTIONS

(75) Inventors: Cheal-gi Kim, Yongin-si (KR); Sung-rae Kang, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/863,370

(22) Filed: Sep. 28, 2007

(65) Prior Publication Data

US 2008/0079868 A1    Apr. 3, 2008

(30) Foreign Application Priority Data

Oct. 2, 2006    (KR) ...................... 10-2006-0097146

(51) Int. Cl.
*F21V 21/08* (2006.01)

(52) U.S. Cl. ........................ 362/219; 362/223; 362/238; 362/249; 362/260

(58) Field of Classification Search ................. 362/217, 362/219, 222, 223, 558, 260, 245, 246, 249, 362/238
See application file for complete search history.

(56) References Cited

U.S. PATENT DOCUMENTS

| | | | | |
|---|---|---|---|---|
| 5,046,826 | A * | 9/1991 | Iwamoto et al. | 349/65 |
| 5,726,722 | A * | 3/1998 | Uehara et al. | 349/66 |
| 5,986,728 | A * | 11/1999 | Bernard | 349/68 |
| 7,255,470 | B2 * | 8/2007 | Lee et al. | 362/614 |
| 2004/0130911 | A1 * | 7/2004 | Chen | 362/558 |

* cited by examiner

*Primary Examiner*—Laura Tso
(74) *Attorney, Agent, or Firm*—F. Chau & Associates, LLC

(57) ABSTRACT

A backlight assembly structured to reduce vibrations and impacts that are transmitted to fluorescent lamps. The backlight assembly includes a diffuser plate diffusing light and including indented portions in a bottom surface thereof, a plurality of lamps disposed under the diffuser plate and emitting the light, and a reflective plate disposed under the lamps and reflecting the light.

20 Claims, 4 Drawing Sheets

BACKLIGHT ASSEMBLY INCLUDING A DIFFUSER PLATE HAVING INDENTED PORTIONS AND A REFLECTIVE PLATE HAVING LAMP INSERTION PORTIONS

CROSS-REFERENCE TO RELATED APPLICATION

This application claims priority from Korean Patent Application No. 10-2006-0097146 filed on Oct. 2, 2006, the disclosure of which is incorporated herein by reference in its entirety

BACKGROUND OF THE INVENTION

1. Technical Field

The present invention relates to a backlight assembly, and more particularly, to a backlight assembly structured to reduce vibrations and impacts that are transmitted to fluorescent lamps.

2. Discussion of the Related Art

Liquid crystal displays (LCDs) are widely used flat panel displays (FPDs). Known LCDs include two substrates, on which electrodes are formed, and a liquid crystal layer interposed between the two substrates. The LCD rearranges liquid crystal molecules of the liquid crystal layer by applying voltage to the electrodes and thus controls the amount of light transmitted.

Being non-self-luminous, LCDs use additional light sources that emit light. An appropriate light source may be selected and used according to the size and purpose of use of an LCD. The light sources may be classified into point light sources such as light emitting diodes, line light sources such as cold cathode fluorescent lamps, and surface light sources according to their forms.

Fluorescent lamps have been used as line light sources. In order to fix the fluorescent lamps, sockets have been used. The sockets connected to the fluorescent lamps can be fixed to an alignment plate, which is disposed on an inner bottom surface of a lower receiving container. The bottom surface of the lower receiving container is separated a predetermined distance away from sidewalls of the lower receiving container.

Diameters of the fluorescent lamps have been reduced in order to obtain a high-luminance backlight per unit area. In addition, the number of fluorescent lamps must be controlled to prevent the generation of bright lines in a diffuser plate.

In a conventional backlight structure, fluorescent lamps are fixed by ring-type plastic lamp holders. This conventional structure fails to prevent impacts from being delivered to the fluorescent lamps. Also, if the diameters of the fluorescent lamps are reduced, they are highly vulnerable to the impacts.

In addition, the conventional backlight structure requires a supporter between a reflective plate and a diffuser plate in order to prevent the reflective plate from sinking downward. Accordingly, an additional process for forming the supporter is needed.

SUMMARY OF THE INVENTION

Exemplary embodiments of the present invention provide a backlight assembly structured to reduce vibrations and impacts that are transmitted to fluorescent lamps.

According to an embodiment of the present invention, a backlight assembly includes a diffuser plate to diffuse light, and including upward indented portions in a bottom surface thereof, a plurality of lamps disposed under the diffuser plate and emitting the light, and a reflective plate disposed under the lamps and reflecting the light.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF EXEMPLARY EMBODIMENTS

Figure 1:
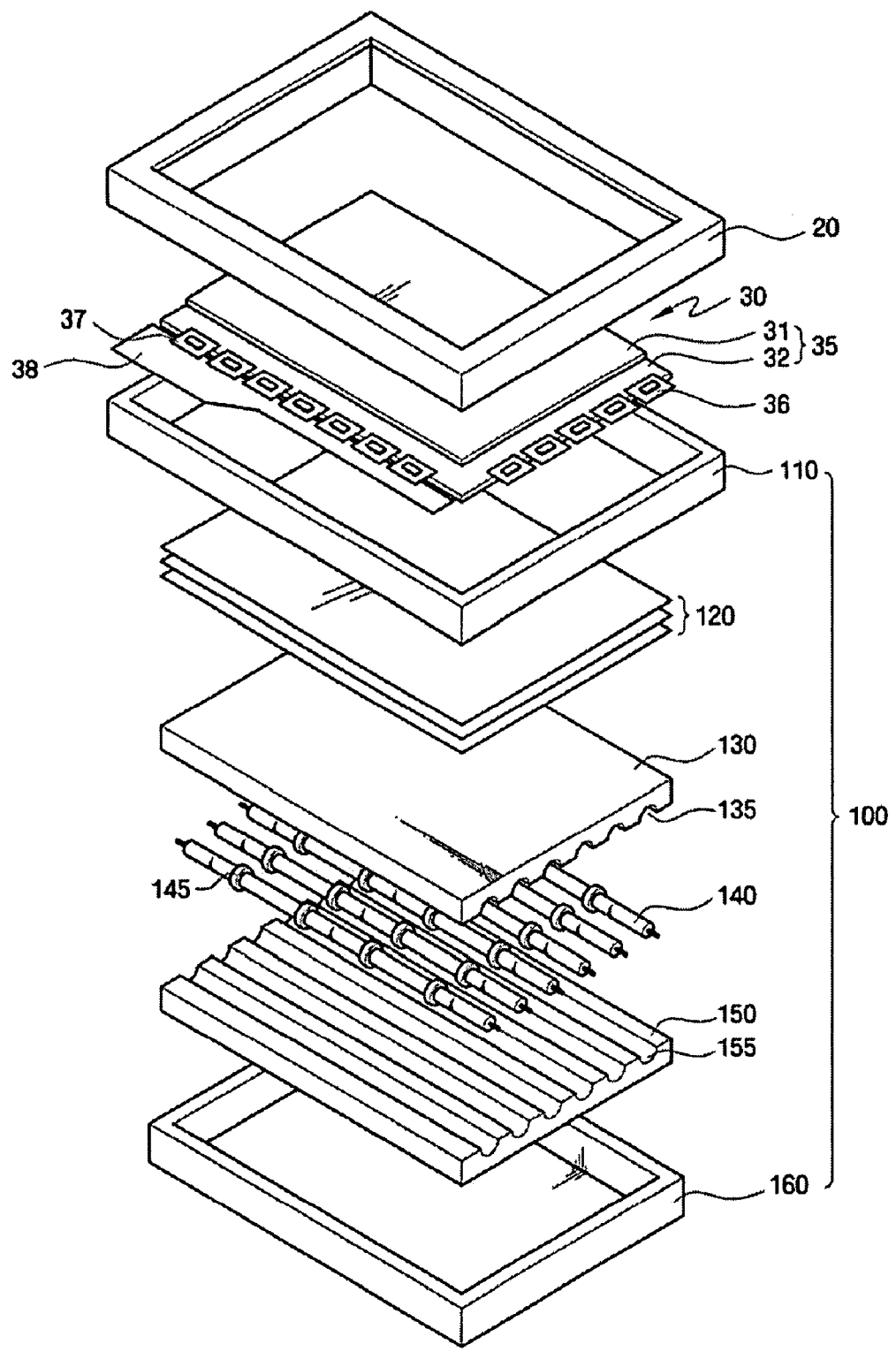
FIG. 1 is an exploded perspective view of a liquid crystal display (LCD) according to an exemplary embodiment of the present invention.

The present invention will now be described more fully with reference to the accompanying drawings, in which exemplary embodiments of the invention are shown. The invention may, however, be embodied in many different forms and should not be construed as being limited to the exemplary embodiments set forth herein. Like reference numerals in the drawings can denote like elements.

Figure 2:
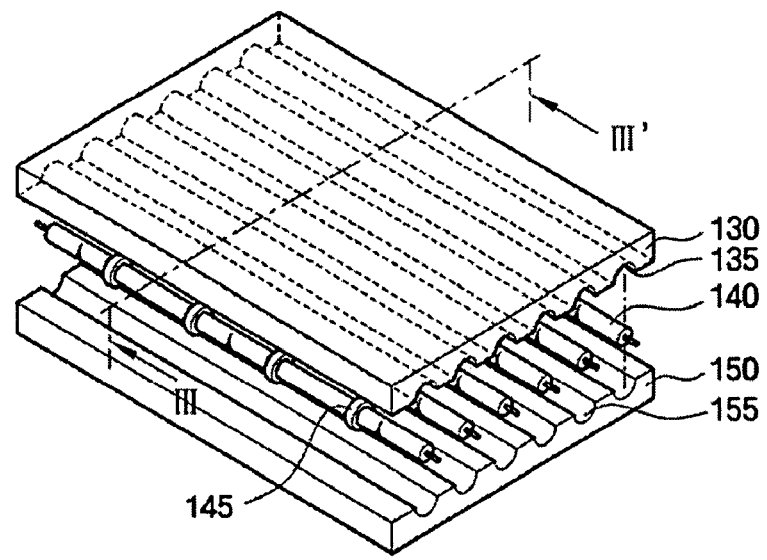
FIG. 2 is an exploded perspective view of a diffuser plate, a plurality of lamps, and a reflective plate included in a backlight assembly of FIG. 1.
Figure 3:
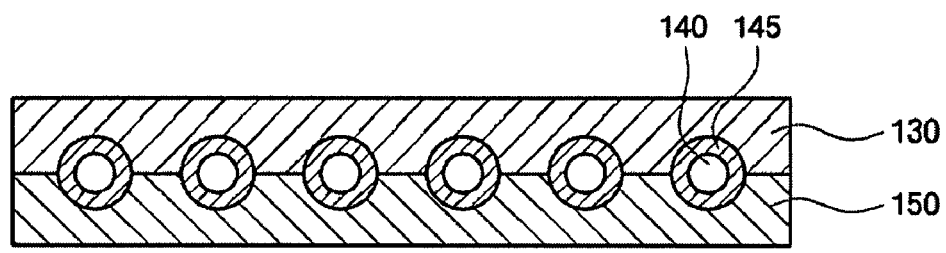
FIG. 3 is a cross-sectional view of the diffuser plate, the lamps, and the reflective plate taken along a line III-III' of FIG. 2.

A backlight assembly according to an exemplary embodiment of the present invention will now be described in detail with reference to FIGS. 1 through 3. FIG. 1 is an exploded perspective view of a liquid crystal display (LCD) 10 according to an exemplary embodiment of the present invention. FIG. 2 is an exploded perspective view of a diffuser plate 130, a plurality of lamps 140, and a reflective plate 150 included in a backlight assembly 100 of FIG. 1. FIG. 3 is a cross-sectional view of the diffuser plate 130, the lamps 140, and the reflective plate 150 taken along a line III-III' of FIG. 2.

Referring to FIG. 1, the LCD 10 includes an upper receiving container 20, a liquid crystal panel assembly 30, and the backlight assembly 100.

The upper receiving container 20 forms the exterior of the LCD 10 and includes an open window and a bezel region. The open window exposing the liquid crystal panel assembly 30 is formed in a central part of the upper receiving container 20, and a bezel region is formed at the edges of a top surface thereof.

The liquid crystal panel assembly 30 includes a liquid crystal panel 35, a gate tape carrier package (TCP) 36, a data TCP 37, and a printed circuit board (PCB) 38.

The liquid crystal panel 35 receives an electrical signal and displays an image on a screen. The liquid crystal panel 35 includes a thin film transistor (TFT) substrate 32 and a color filter substrate 31, which are opposed to and attached to each other with a predetermined gap therebetween, and a liquid crystal layer between the TFT substrate 32 and the color filter substrate 31.

A plurality of gate lines and a plurality of data lines are formed on the TFT substrate 32, and the data lines are driven by driving chips on the PCB 38. In addition, the gate lines are driven by a line driving unit formed on the TFT substrate 32.

The backlight assembly 100 includes a mid frame 110, an optical sheet 120, the diffuser plate 130, the lamps 140, the reflective plate 150, and a lower receiving container 160.

The mid frame 110 accommodates the optical sheet 120, the diffuser plate 130, the reflective plate 150, and the lamps 140 therein and is fixed to the lower receiving container 160. The mid frame 110 protects the optical sheet 120, the diffuser plate 130, and the lamps 140. The mid frame 110 is composed of rectangular sidewalls formed along its edges. In addition, an open window is formed in the central part of the mid frame 110 to allow light passed through the diffuser plate 130 and the optical sheet 120 to be transmitted therethrough.

The optical sheet 120 diffuses and collects light from the diffuser plate 130. The optical sheet 120 is disposed on the diffuser plate 130 and is received in the mid frame 110. The optical sheet 120 includes a first prism sheet and a second prism sheet.

The first and second prism sheets refract light that passes through the diffuser plate 130 and concentrate the light incident at a low angle towards the liquid crystal panel 35, thereby enhancing the brightness of the LCD 10 within an effective viewing angle range. Two prism sheets may be used in order to refract light from all directions and maximize the refraction effects. However, if one prism sheet is sufficient, only the first prism sheet may be used.

The diffuser plate 130 diffuses light from the lamps 140 in multiple directions and prevents bright lines, which are formed as bright portions along the shapes of the lamps 140, from being seen from the front of the LCD 10.

The backlight assembly 100 according to the present exemplary embodiment is a direct-type backlight assembly in which the lamps 140 are arranged under the diffuser plate 130. Alternatively, in an edge-type backlight assembly, lamps are disposed on sides of a light guide plate, and light is supplied from the lamps to a liquid crystal panel using a light guide plate. Light directly supplied from the lamps 140 of the direct-type backlight assembly 100 to the liquid crystal panel 35 results in the appearance of bright lines of the lamps 140. In order to prevent these bright lines of the lamps 140 from being seen, the thick diffuser plate 130 is used instead of a thin diffuser sheet.

Referring to FIGS. 2 and 3, the diffuser plate 130 includes indented portions 135 formed in a bottom surface thereof and shaped like the lamps 140. The indented portions 135 are indented toward the top surface of the diffuser plate 130 to make furrows extending in a lengthwise direction of the lamps 140. The indented portions 135 may be formed to have semicircular cross sections. However, the cross sections of the indented portions 135 may have various shapes in order to effectively diffuse light emitted from the lamps 140.

Since the lamps 140 are disposed on the indented portions 135, the indented portions 135 directly receive light from the lamps 140 and evenly emit the light through the top surface of the diffuser plate 130.

Diameters of the indented portions 135 may be greater than those of the lamps 140. Therefore, the diameters of the indented portions 135 may vary according to the diameters of the lamps 140 used. In addition, since the number of the indented portions 135 is equal to the number of the lamps 140, the number may vary according to the amount of light required by the liquid crystal panel 35.

The diffuser plate 130 should be sufficiently thick to prevent light supplied to the liquid crystal panel 35 through the optical sheet 120 from having bright lines. However, as the diffuser plate 130 becomes thicker, light utilization efficiency is reduced. Therefore, the diffuser plate 130 may be formed to have a minimum thickness based on prevention of the bright lines, and interference between adjacent lamps 140 according to the number and arrangement method of the lamps 140.

As an alternative to the diffuser plate 130 having the indented portions 135, a flat diffuser plate may also be used. In addition, one thick plate or a plurality of thin sheets may be used as the diffuser plate 130.

The lamps 140 supply light to the liquid crystal panel 35. Although various lamps may be used as the lamps 140, fluorescent lamps are used in the present exemplary embodiment. The fluorescent lamps may be cold cathode fluorescent lamps (CCFLs) or external electrode fluorescent lamps (EEFLs). When a lamp driving voltage is applied to the lamps 140 from voltage source, the lamps 140 emit light. The lamps 140 may be separated a predetermined distance from one other, connected in parallel to each other on an equiphase plane, and formed directly under the diffuser plate 130.

In the direct-type structure used in the present exemplary embodiment, the lamps 140 are arranged under the diffuser plate 130. The diameters of the lamps 140 may be reduced to reduce the thickness of the LCD. In order to prevent the lamps 140 having the reduced diameter from being vulnerable to impacts and vibrations, buffer portions 145 are used.

Referring to FIGS. 2 and 3, the buffer portions 145 fix the lamps 140 and are coupled between the diffuser plate 130 and the reflective plate 150. The buffer portions 145 absorb impacts transmitted to the lamps 140. The buffer portions 145 are ring-shaped. The central parts of the buffer portions contact and can be coupled to the lamps 140. In addition, the outer circumferential surfaces of the buffer portions 145 contact and can be coupled to the indented portions 135 of the diffuser plate 130 and lamp insertion portions 155 of the reflective plate 150.

The buffer portions 145 buffer the lamps 140 against impacts and vibrations transmitted to the liquid crystal panel assembly 30. In addition, the buffer portions 145 may be formed of heat-resistant materials that can tolerate the heat of the lamps 140. If light from the lamps 140 is prevented from reaching the diffuser plate 130, it appears as dark spots in the diffuser plate 130. Therefore, the buffer portions 145 are formed of transparent materials to effectively deliver the light from the lamps 140 to the diffuser plate 130. Materials having the above properties may be, for example, silicon or transparent rubber.

The buffer portions 145 are interposed between the diffuser plate 130 and the reflective plate 150 at regular intervals and function as spacers for preventing the diffuser plate 130 from sinking downward toward the reflective plate 150. Thus, if the buffer portions 145 are used, spacers can be omitted. The position and interval of the buffer portions 145 are determined based on the diameters of the lamps 140 and the stiffness of the diffuser plate 130.

The reflective plate 150 reflects light emitted downward from the lamps 140 toward the liquid crystal panel 35, thereby enhancing the utilization efficiency of the light. The reflective plate 150 is disposed under the lamps 140 and coated with a color having desired light reflection properties. A thin reflective sheet may be used as the reflective plate 150.

The reflective sheet 150 includes the lamp insertion portions 155 in a top surface thereof. The lamp insertion portions 155 formed in the top surface of the reflective plate 150 are shaped like furrows and extend in the lengthwise direction of the lamps 140. The lamp insertion portions 155 may be formed longer than the lengths of the lamps 140 and may have semicircular cross sections.

Alternatively, the cross sections of the lamp insertion portions 155 may have various shapes other than semicircular. For example, the cross sections of the lamp insertion portions 155 may be parabolic. In addition, the reflective plate 150 may be integrated into the lower receiving container 160.

Figure 4:
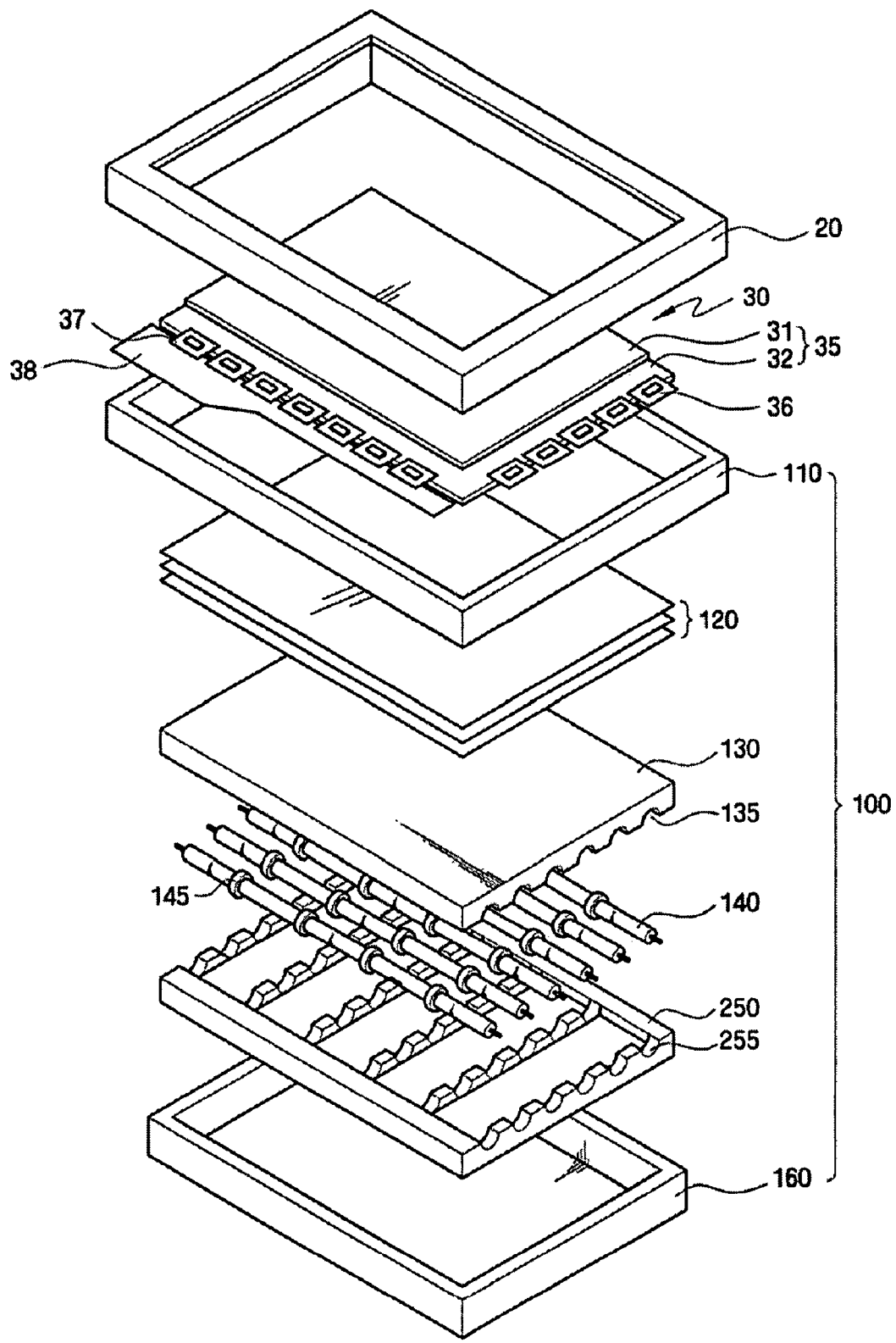
FIG. 4 is an exploded perspective view of an LCD according to an exemplary embodiment of the present invention.

A backlight assembly according to an exemplary embodiment of the present invention will now be described in detail with reference to FIGS. 4 through 6. FIG. 4 is an exploded perspective view of an LCD 10 according to an exemplary embodiment of the present invention.

Figure 5:
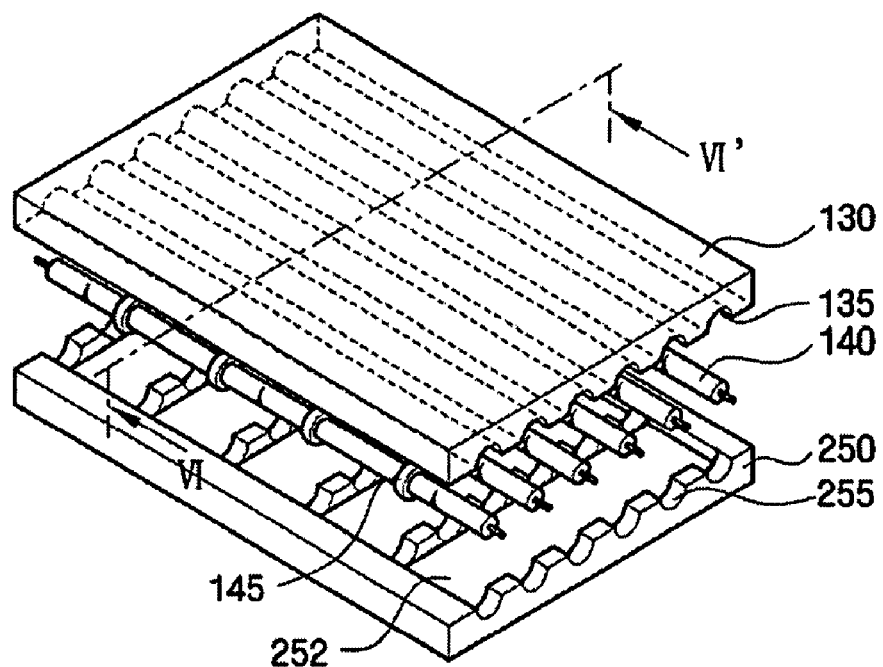
FIG. 5 is an exploded perspective view of a diffuser plate, a plurality of lamps, and a reflective plate included in a backlight assembly of FIG. 4.
Figure 6:
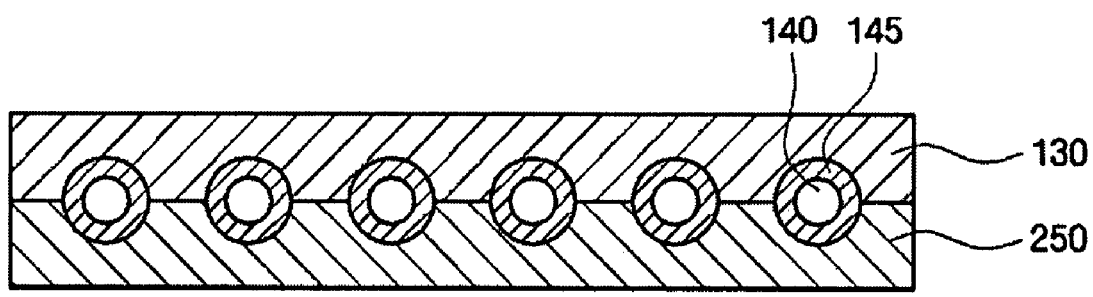
FIG. 6 is a cross-sectional view of the diffuser plate, the lamps, and the reflective plate taken along a line VI-VI' of FIG. 5.

FIG. 5 is an exploded perspective view of a diffuser plate 130, a plurality of lamps 140, and a reflective plate 250 included in a backlight assembly 100 of FIG. 4. FIG. 6 is a cross-sectional view of the diffuser plate 130, the lamps 140, and the reflective plate 250 taken along a line VI-VI' of FIG. 5.

As illustrated in FIG. 4, the backlight assembly 100 has a similar structure to the backlight assembly 100 illustrated in FIG. 1, with some exceptions.

The backlight assembly 100 shown in FIG. 4 includes lamp insertion portions 255 which are formed in the reflective plate 250 at regular intervals and which receive and fix the lamps 140.

The lamp insertion portions 255 formed in the reflective plate 250 are separated a predetermined distance from one another, and a reflective portion 252 functioning as a reflective surface is interposed between the lamp insertion portions 255.

The lamp insertion portions 255 are not necessarily formed continuously, and may be formed at regular intervals.

The reflective portion 252 is interposed between the lamp insertion portions 255 and reflects light from the lamps 140 toward the diffuser plate 130. The reflective portion 252 may be a flat reflective sheet or have a curved surface in order to efficiently reflect light.

The diffuser plate 130 has indented portions 135. Alternatively, the diffuser plate 130 may be flat or may have grooves (not shown), which can contact and can be coupled to the buffer portions 145 of the lamps 140, at locations corresponding to the lamp insertion portions 255 of the reflective plate 250.

As described above, in a backlight assembly according to embodiments of the present invention, furrows are formed in a reflective plate and a diffuser plate, and fluorescent lamps having buffer portions are formed between the reflective plate and the diffuser plate. Therefore, vibrations and impacts transmitted to the fluorescent lamps can be effectively reduced, thereby preventing damage to the fluorescent lamps.

While the present invention has been shown and described with reference to exemplary embodiments thereof, it will be understood by those of ordinary skill in the art that various changes may be made therein without departing from the spirit and scope of the present invention as defined by the following claims.

What is claimed is:

1. A backlight assembly comprising:
   a diffuser plate comprising indented portions in a bottom surface of the diffuser plate;
   a reflective plate disposed under the diffuser plate and including lamp insertion portions formed in a top surface of the reflective plate, wherein the lamp insertion portions correspond to the indented portions of the diffuser plate; and
   a plurality of lamps interposed between the diffuser plate and the reflective plate, wherein the lamp insertion portions comprise a plurality of grooves formed in the reflective plate and receiving the plurality of lamps therein.

2. The backlight assembly of claim 1, wherein the indented portions each have a furrow shape and extend in a lengthwise direction of the lamps.

3. The backlight assembly of claim 1, wherein the indented portions have semicircular cross-sections.

4. The backlight assembly of claim 1, further comprising buffer portions formed on outer surfaces of the lamps, wherein the buffer portions are positioned between the diffuser plate and the reflective plate.

5. The backlight assembly of claim 4, wherein the Duffer portions are interposed between the indented portions and the lamp insertion portions.

6. The backlight assembly of claim 4, wherein the buffer portions have a ring shape.

7. The backlight assembly of claim 4, wherein the buffer portions include a transparent material.

8. The backlight assembly of claim 7, wherein the buffer portions include silicon or rubber.

9. The backlight assembly of claim 1, wherein the lamp insertion portions each have a furrow shape and extend in the lengthwise direction of the lamps.

10. The backlight assembly of claim 9, wherein the lamp insertion portions have semicircular cross-sections.

11. The backlight assembly of claim 9, wherein the lamp insertion portions have parabolic cross-sections.

12. The backlight assembly of claim 9, wherein the lamp insertion portions are separated from one another at regular intervals, and the reflective plate comprises a reflective surface between the lamp insertion portions.

13. The backlight assembly of claim 12, wherein the reflective surface is flat.

14. The backlight assembly of claim 12, wherein the reflective surface is curved.

15. A liquid crystal display comprising:
    a liquid crystal panel displaying an image; and
    a backlight assembly including a diffuser plate having indented portions in a bottom surface of the diffuser plate,
    a reflective plate disposed under the diffuser plate and including lamp insertion portions formed in a top surface of the reflective plate, wherein the lamp insertion portions correspond to the indented portions of the diffuser plate, and
    a plurality of lamps interposed between the diffuser plate and the reflective plate, wherein the lamp insertion portions comprise a plurality of grooves formed in the reflective plate and receiving the plurality of lamps therein.

16. The liquid crystal display of claim 15, wherein the indented portions each have a furrow shape and extend in the lengthwise direction of the lamps.

17. The liquid crystal display of claim 15, wherein the lamp insertion portions each have a furrow shape and extend in the lengthwise direction of the lamps.

18. The liquid crystal display of claim 15, further comprising buffer portions formed on outer surfaces of the lamps, wherein the buffer portions are positioned between the diffuser plate and the reflective plate.

19. The liquid crystal display of claim 18, wherein the buffer portions are interposed between the indented portions and the lamp insertion portions.

20. The liquid crystal display of claim 15, wherein the lamp insertion portions are separated from one another at regular intervals, and the reflective plate comprises a reflective surface between the lamp insertion portions.

* * * * *